United States Patent

Ogura et al.

[11] Patent Number: 5,897,274
[45] Date of Patent: Apr. 27, 1999

[54] ROTATING BORING TOOL

[75] Inventors: Norio Ogura; Tetsuro Mantani; Satoru Nishio, all of Aichi, Japan

[73] Assignee: Kanefusa Kabushiki Kaisha, Aichi, Japan

[21] Appl. No.: 08/793,338

[22] PCT Filed: Oct. 25, 1995

[86] PCT No.: PCT/JP95/02198

§ 371 Date: Feb. 26, 1997

§ 102(e) Date: Feb. 26, 1997

[87] PCT Pub. No.: WO96/13364

PCT Pub. Date: Sep. 5, 1996

[30] Foreign Application Priority Data

Nov. 1, 1994 [JP] Japan ................................ 6-293807

[51] Int. Cl.⁶ ..................................................... B23B 51/02
[52] U.S. Cl. ........................................... 408/230; 408/229
[58] Field of Search ..................................... 408/229, 230

[56] References Cited

U.S. PATENT DOCUMENTS

| 542,223 | 7/1895 | Johnson | 408/230 |
| 4,740,121 | 4/1988 | Arnold | 408/230 |
| 5,782,587 | 7/1998 | Basteck | 408/230 |

FOREIGN PATENT DOCUMENTS

| 61-226209 | 10/1986 | Japan . |
| 62-157707 | 7/1987 | Japan . |
| 64-78711 | 3/1989 | Japan . |
| 1 682 050 | 10/1991 | Russian Federation . |
| 2 184 373 | 6/1987 | United Kingdom . |

Primary Examiner—Steven C. Bishop
Attorney, Agent, or Firm—Oblon, Spivak, McCleland, Maier & Neustadt, P.C.

[57] ABSTRACT

A rotating boring tool (10) comprises a cylindrical shank (11) and a body (12), both of which are coaxial with each other, said body being provided at its tip end with cutting blades (13a, 13b) which are in point symmetry with respect to an axis of the shank. Provided on the body are two flutes (14a, 14b) continuous from the cutting blades. The both flutes are made to approach each other at the lower half lead portions (designated hereinbelow as f1 portions) of terminal end portions f0 of the flutes and positioned about 35 degrees or more offset from the position of point symmetry. Alternatively, the both flutes are merged at the f1 portions. Accordingly, thickened portions y0 are formed on the f1 portions to increase rigidity of the f1 portions. As a result, it is possible to suppress generation of fatigue failure at the f1 portions whereby a rotating boring tool of long service life which is hard to break is obtained and a product cost and a cost for tool replacement are considerably reduced.

3 Claims, 15 Drawing Sheets

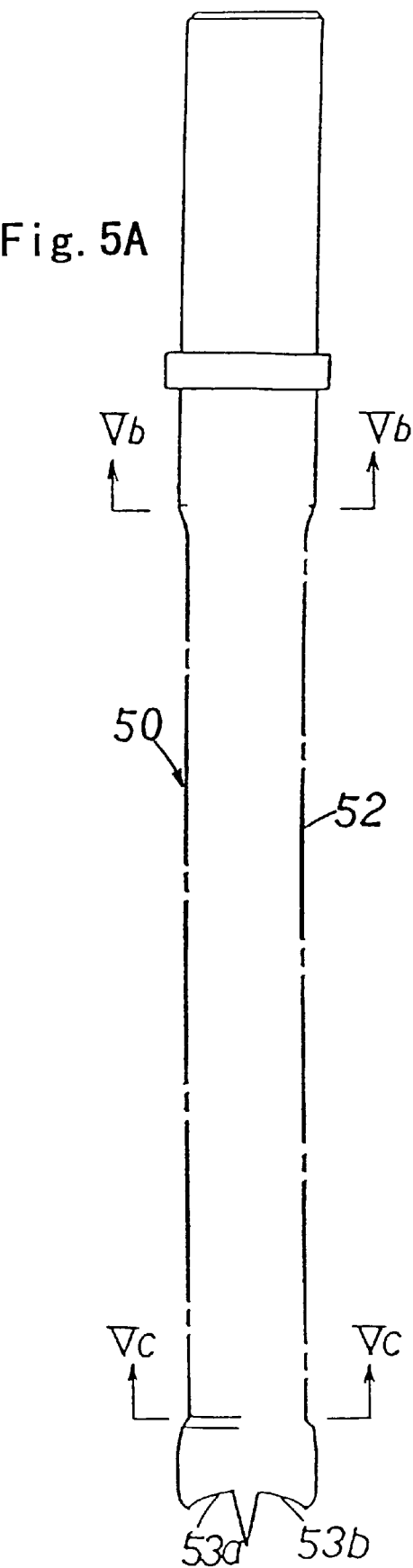
Fig. 5A
Fig. 5B
Fig. 5C

Fig. 10A  Prior Art
Fig. 10B  Prior Art
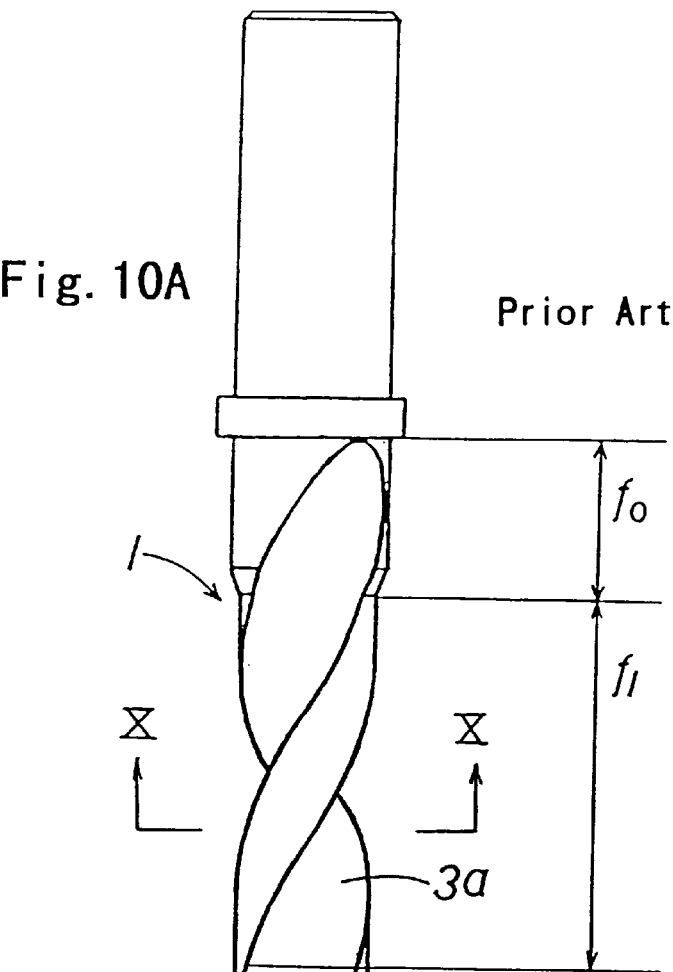
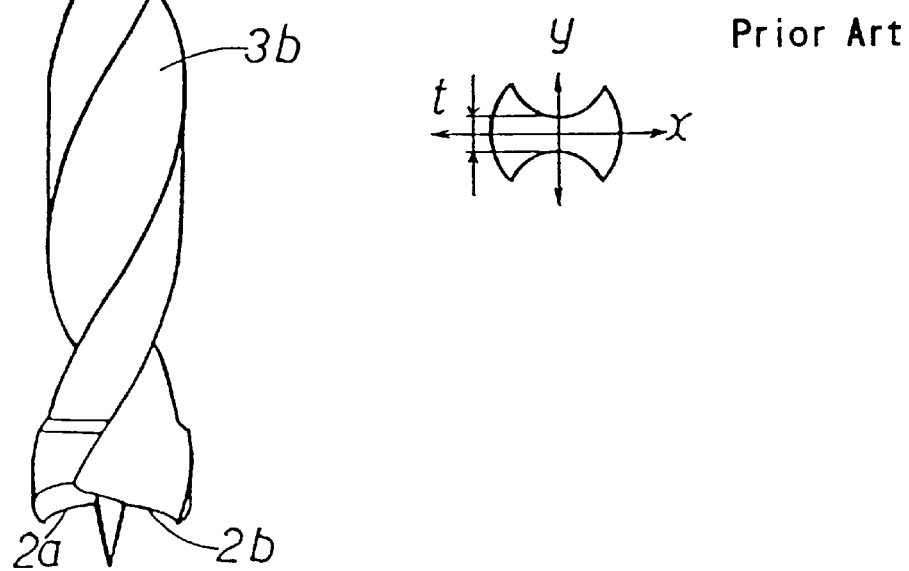

ROTATING BORING TOOL

TECHNICAL FIELD

The present invention relates to a rotating boring tool for boring wood, metal, and other works to be bored and, more particularly, to a rotating boring tool suitable for boring, at a high boring speed, works to be bored such as wood, woody material, e.g., particle board, and plastics, plasterboard, foamed concrete, and other inorganic materials, equivalent to wood, which produce a large amount of chips when bored.

BACKGROUND ART

In general this type of rotating boring tool, as shown for example in FIG. 10A, 10B is provided at its tip end of a body 1 with main cutting blades 2a and 2b in two places of point symmetry with respect to the axis of the tool. In the body 1 two chip discharging grooves 3a, 3b (hereinafter referred to as the flutes) are formed continuously from the main cutting blades 2a and 2b. Tool sections within the range where the flutes 3a and 3b are formed are in point symmetry with respect to the axis of the tool at any point as shown in FIG. 10B. A metal cutting drill in general is of the same system as the above-mentioned tool notwithstanding a difference in the shape of the cutting blades at the tip end.

There is also a rotating boring tool provided with three flutes and the same number of cutting blades equally spaced at the tip end of the body. In this case also, the tool sections within the range in which the flutes are formed are arranged at a nearly equal center angle with respect to the axis of the tool at any point.

The rotating boring tool stated above has been considered to cut well while advancing straight on account of the equal, well-balanced distribution of cutting resistance to the cutting blades during boring. Actually, however, it has become clear that it is very difficult to equally distribute the cutting resistance to each cutting blade. That is, because of low-precision mounting of the rotating boring tool to the rotating spindle, or a machining inaccuracy of the tip end of the tool occurring in manufacturing the rotating boring tool, and further nonuniform internal structure or presence of directional properties in a work to be bored, the uniformity of cutting resistance is deteriorated during boring operation even if the rotating boring tool is mounted accurately and other conditions are in order.

Therefore since a component force of the cutting resistance, frictional resistance, etc. acts at the tip end of the rotating boring tool, at right angles with the axis of the tool, the straightforward advance of the rotating boring tool is disturbed, and it causes the rotating boring tool to swerve more or less during boring. Particularly if the effective length of the flutes empirically exceeds seven times longer than the tool diameter, boring accuracy will be lowered when the rotating boring tool is used in deep hole boring.

Also, there sometimes occurred such a trouble as sudden breakage of the rotating boring tool. In most cases, no cause of the breakage could be found; and it has been thought to the extent that it is the cause to break easily that the rotating boring tool is slender. The inventor et al of the present invention, however, have made researches of breakage of the rotating boring tool, finding out a cause of the breakage.

In the case of the rotating boring tool having the aforesaid two flutes, an arbitrary section of a portion in which the flutes are effectively formed is of the shape shown in FIG. 10B. It is, however, clear that this portion has lower rigidity against bending in the y direction than in the x direction. The flutes are spiral and the tool bores while turning. Therefore the direction of the component force stated above coincides with the y direction in the section of a certain portion of the range within a ½ lead (hereinafter termed the f1 portion) before the terminal end portion f0 of the flutes is reached. Consequently if the component force perpendicular to the axis of the tool acts at the tip end of the rotating boring tool, the tool will be warped at some point of the f1 portion, swerving during boring. That is, the rotating boring tool will be subjected to repetitive bending at a rapid cycle within the f1 portion during rotation for boring. This bending remains within an elastic limit; the repetitive boring operation will cause a fatigue to arise in the f1 portion, resulting in a breakage in the f1 portion of the rotating boring tool.

Such a problem can be prevented by increasing the rigidity of the f1 portion; as a method for increasing the rigidity, the flutes in the entire portion or in the f1 portion are made shallower to increase the axial width of the rotating boring tool or made narrower to increase the width of the entire section. According to these two methods, however, it is necessary to shallow or narrow the flutes to the extent that chips can not smoothly be discharged. Particularly these methods are unapplicable to a rotating boring tool used in a deep hole boring of wood or the like which produces a large amount of chips per revolution of the tool.

To solve the above-described problem, the present invention has an object to provide a long-life, hard-to-break rotating boring tool having greater rigidity in the f1 portion without adversely affecting smooth discharge of chips in order to assure unswerving boring during boring operation.

BRIEF DESCRIPTION OF THE DRAWINGS

FIG. 5A is a front view schematically showing a modification 2 of the rotating boring tool;

FIG. 5B is a sectional view of the rotating boring tool illustrated in FIG. 5A along the line $V_b$—$V_b$;

FIG. 5C is a sectional view of the rotating boring tool illustrated in FIG. 5A along the line $V_c$—$V_c$;

FIG. 10A is a front view schematically showing a prior art rotating boring tool; and FIG. 10B is a sectional view of the rotating boring tool illustrated in FIG. 10A.

DISCLOSURE OF THE INVENTION

Figure 1A:
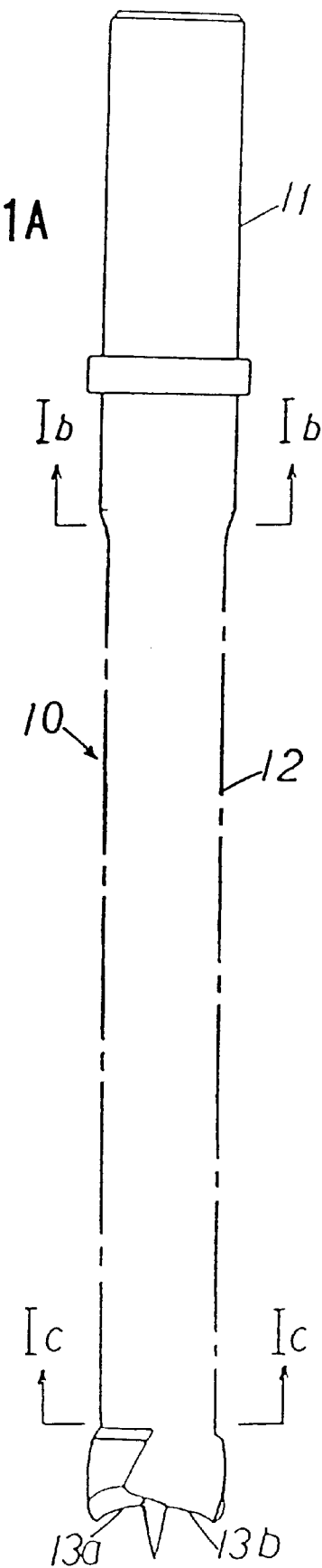
FIG. 1A is a front view schematically showing a first embodiment of a rotating boring tool according to the present invention.

To accomplish the above-described object, the constitution of the first invention is characterized in that the present invention provides a rod-like rotating boring tool having a shank and a body; the tool has main cutting blades at two to four places of the tip end portion of the body; main flutes are formed in the body, continuously from the main cutting blades; and within the range of at least a ½ lead (based on the lead of flutes of smaller helix angle when the helix angle of each main flute differs) before the terminal end portion of the main flutes, the flutes are formed to approach them or joined, that is, make one part of thick portions wider so that the minimum value of flexural rigidity within the range of formation of a widened thick portion will be over 89% of the maximum value.

In the first invention of the above-described constitution, the flutes in the f1 portion are formed to fully approach each other or joined, to thereby increase the width of a portion on the opposite side of the flutes formed to approach each other or to be joined. Consequently the f1 portion is increased in rigidity, which enables to suppress generation of fatigue failure in this portion and accordingly can realize a long-life, hard-to-break rotating boring tool.

As a result the rotating boring tool has been improved in reliability, and also a product cost and a cost of the rotating boring tool, substantially decreased. Furthermore, with the realization of the long-life rotating boring tool, it has become possible to adapt the tool to unattended automatic cutting operation.

Furthermore, the constitution of the second invention is characterized in that the rotating boring tool is a rod-like rotating boring tool having a shank and a body; the tool has main cutting blades in two places of point symmetry with respect to the axis at the tip end portion of the body; two flutes are formed in the body, continuously from the main cutting blades, and also has a different helix angle partly or through the entire portion; and within the range of at least a ½ lead (based on the lead of flutes of smaller helix angle when the helix angle of each main flute differs) before the terminal end portion of the main flutes, the flutes are formed to approach each other or joined, that is, make one part of thick portions wider, so that the minimum value of flexural rigidity within the range of formation of a widened thick portion will be over 89% of the maximum value.

In the second invention of the above-described constitution, the rotating boring tool has cutting blades in point symmetry for cutting with a balanced cutting resistance and is provided with flutes in the f1 portion; the flutes are formed to virtually approach each other or joined, to thereby increase the width of a portion on the opposite side of the flutes formed to approach each other or to be joined. Therefore the f1 portion is increased in rigidity, in addition to the improved balance by the symmetrical arrangement of the cutting blades, by which the generation of fatigue failure in this f1 portion can be suppressed and accordingly a long-life, hard-to-break rotating boring tool can be realized.

As a result the rotating boring tool has been improved in reliability, and also a product cost and a cost for replacement of the rotating boring tool, substantially decreased. Furthermore, with the realization of the long-life rotating boring tool, it has become possible to adapt the tool to unattended automatic cutting operation.

Furthermore, the constitution of the third invention is characterized in that the present invention provides a rod-like rotating boring tool having a shank and a body; the tool has main cutting blades at two places, imbalanced with respect to the axis, at the tip end portion of the body; main two flutes are provided in the body, continuously from the main cutting blades; and within the range of at least a ½ lead (based on the lead of flutes of smaller helix angle when the helix angle of each main flute differs) before the terminal end portion of the flutes, the flutes are formed to approach each other or joined to provide a partly thickened portion so that the minimum value of flexural rigidity within the range of formation of a widened thick portion will be over 89% of the maximum value.

In the third invention of the above-described constitution, the flutes are imbalanced from the position of the cutting blades; the flutes in the f1 portion are formed to fully approach each other or joined, to thereby increase the width of a portion on the opposite side of the flutes formed to approach each other or to be joined.

Consequently, in the third invention, as in the first and second invention, the same effect such as restraining the occurrence of fatigue failure in the f1 portion of the rotating boring tool is obtainable.

BEST MODE FOR CARRYING OUT THE INVENTION

Hereinafter the best mode for carrying out the invention will be described with reference to the accompanying drawings, in which FIG. 1A–1D schematically shows a first embodiment of a rotating boring tool 10.

Figure 1B:
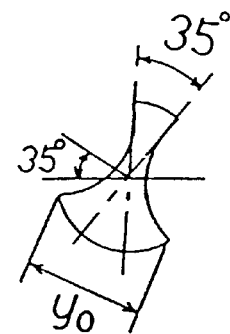
FIG. 1B is a sectional view of the rotating boring tool illustrated in FIG. 1A along the line $I_b$—$I_b$.
Figure 1C:
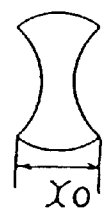
FIG. 1C is a sectional view of the rotating boring tool illustrated in FIG. 1A along the line $I_c$–$I_c$.
Figure 1D:
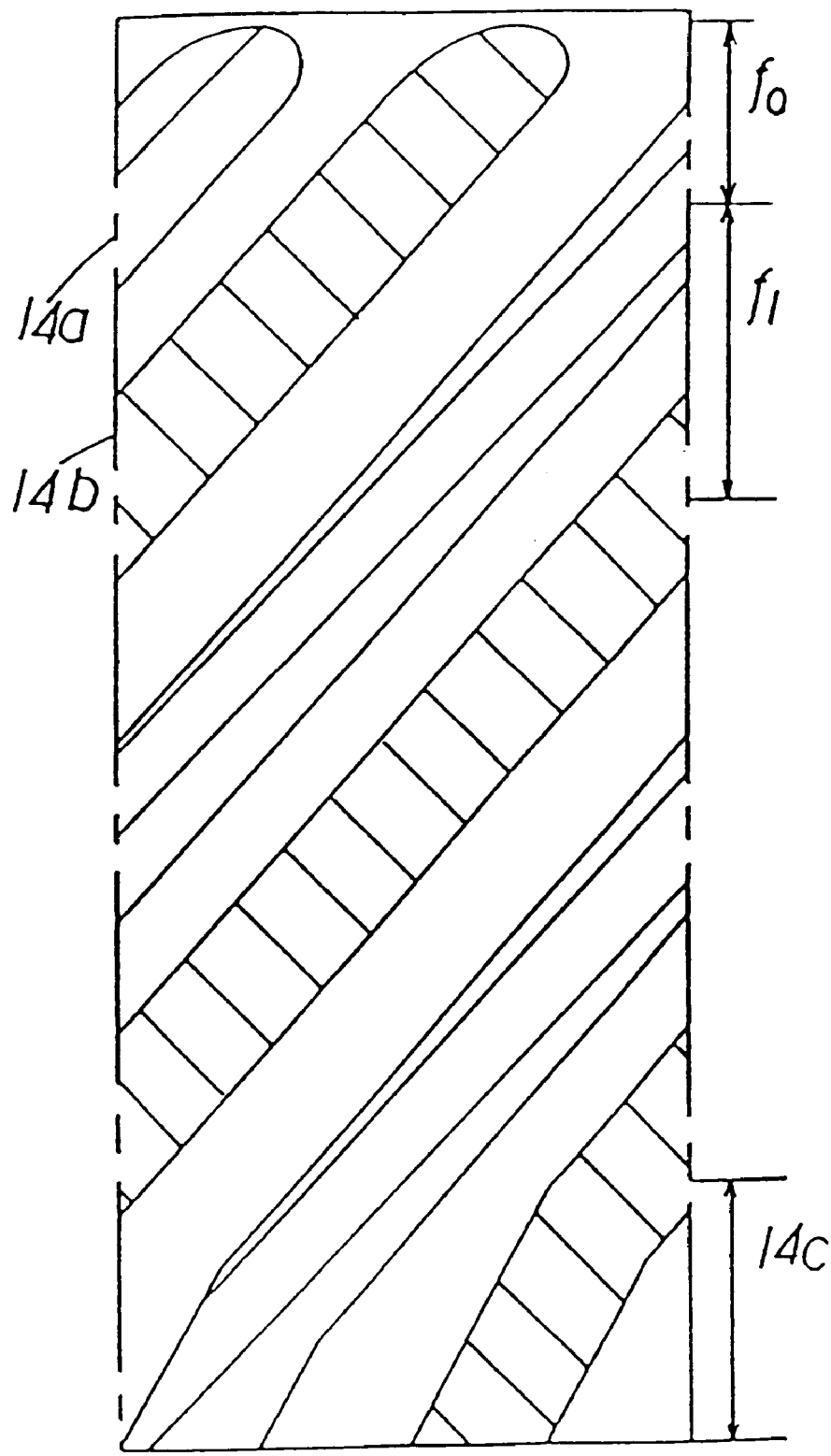
FIG. 1D is a development of the flutes showing a first embodiment of the rotating boring tool.

The rotating boring tool 10 has a cylindrical shank 11 and a body 12, which are coaxially formed. At the tip end of the body 12 a pair of cutting blades 13a and 13b are provided in point symmetrical positions with respect to the axis of the tool. And the body 12 is provided with two flutes 14a and 14b formed continuously from the cutting blades 13a and 13b as shown in the development of flutes FIG. 1D. The flutes 14a, 14b differ in the helix angle between the vicinity of lower end 14c and the upper portion thereof. The both flutes 14a and 14b are off the symmetrical positions in the upper portion of 14c in FIG. 1D, being contiguous to each other. Also at the ½ lead portions (hereinafter termed the f1 portion) below the terminal end portion f0 of the flutes, the flutes 14a and 14b are formed about 35 degrees imbalanced from the positions of point symmetry. That is, in the lower side of the body 12, the flutes are in symmetrical positions and have the maximum width of x0 as shown in the sectional view of FIG. 1C. In the meanwhile, in the upper end position of the f1 portion of the body 12, the flutes are formed about 35 degrees imbalanced from the symmetrical positions as shown in FIG. 1B, and therefore a widened thick portion y0 is formed. The width y0 is about 1.3 times as large as the width x0.

A fatigue failure test was conducted on specimens pertaining to the first embodiment.

The specimens used are B1 (a specimen of the type shown in FIG. 1A, measuring 3.5 mm which is twice larger than the bottom diameter of the flutes, that is, the distance from the axis to the bottom of the flutes, and having a helix angle of flutes of 30 degrees in the f1 portion), B2 (a specimen in which the flutes, in B1, within a range of 50 mm under the terminal end portion f0 of the flutes gradually decrease in depth as they approach the shank; the bottom diameter of the flutes is 3.5 mm at a position of 50 mm under the f0 portion, and 5.3 mm near the f0 portion), and B3 (a specimen in which the flutes, in B2, are positioned 60 degrees imbalanced from the positions of point symmetry). All the specimens described below measure 206 mm in body length and 14.4 mm in diameter. Beside the specimens stated above, later-described specimens A1 to A3 and conventional specimens C1 and C2 were used. The conventional specimens are C1 (the type shown in FIG. 10A having the same bottom diameter of flutes and helix angle of flutes in the f1 portion as B1), and C2 (the type, in C1, in which a change in the bottom diameter of flutes is the same as that of B2).

Figure 6:
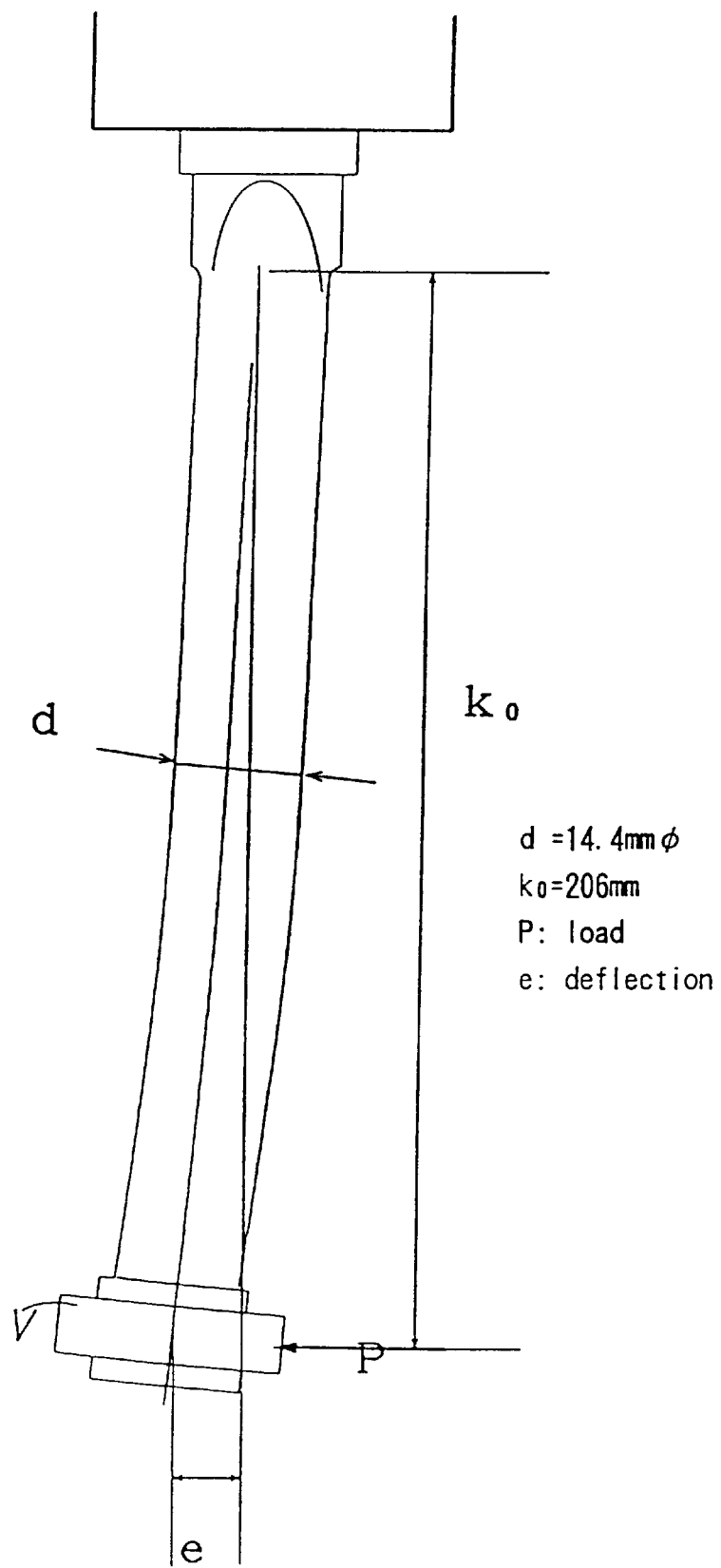
FIG. 6 is an explanatory view explaining a method of testing for measuring fatigue failure properties of the rotating boring tool.

A testing method, as shown in FIG. 6, includes the steps of mounting a bearing V at the tip end portion of the specimen B, pressing an unillustrated block against the bearing V with the load P at right angles with the axis of the specimen B, fixing the specimen B in the deflected state e of the specimen B, measuring the load P and the amount of deflection of the specimen, and measuring the number of revolutions until the specimen fractures when turned under an applied load.

Figure 7:
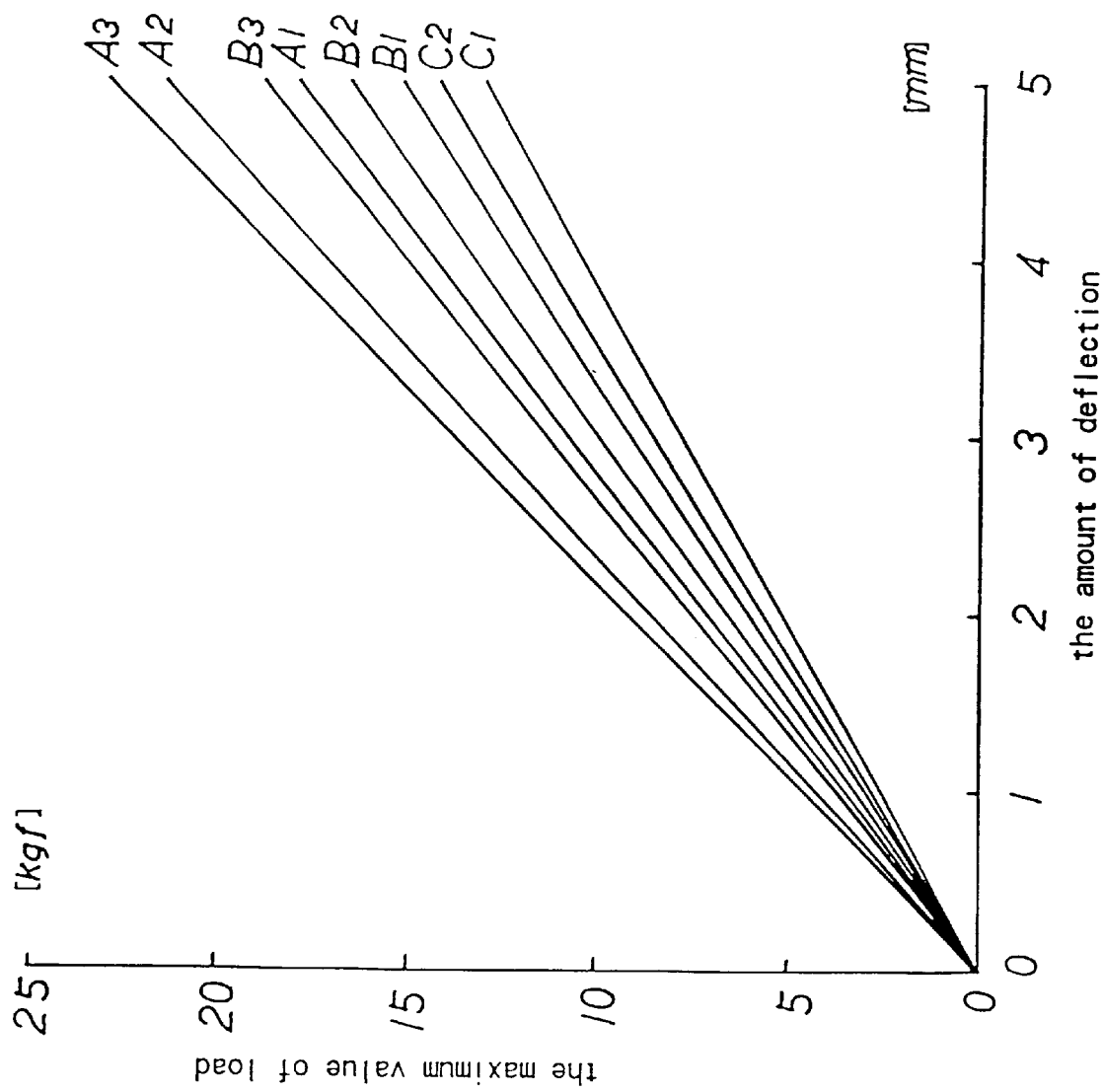
FIG. 7 is a graph showing a relation between the amount of deflection and the maximum value of load of the rotating boring tool measured by the method shown in FIG. 6.

Next, a result of measurements will be described. First, shown in FIG. 7 is a relation between the maximum value of load $P_{max}$ (kgf) and the amount of deflection (mm). There is established a proportional relation between the amount of deflection up to 5 mm and the load. The specimen B requires a greater load than the conventional specimen C to obtain the same amount of deflection. That is, the specimen B has a greater rigidity than the specimen C.

Figure 8:
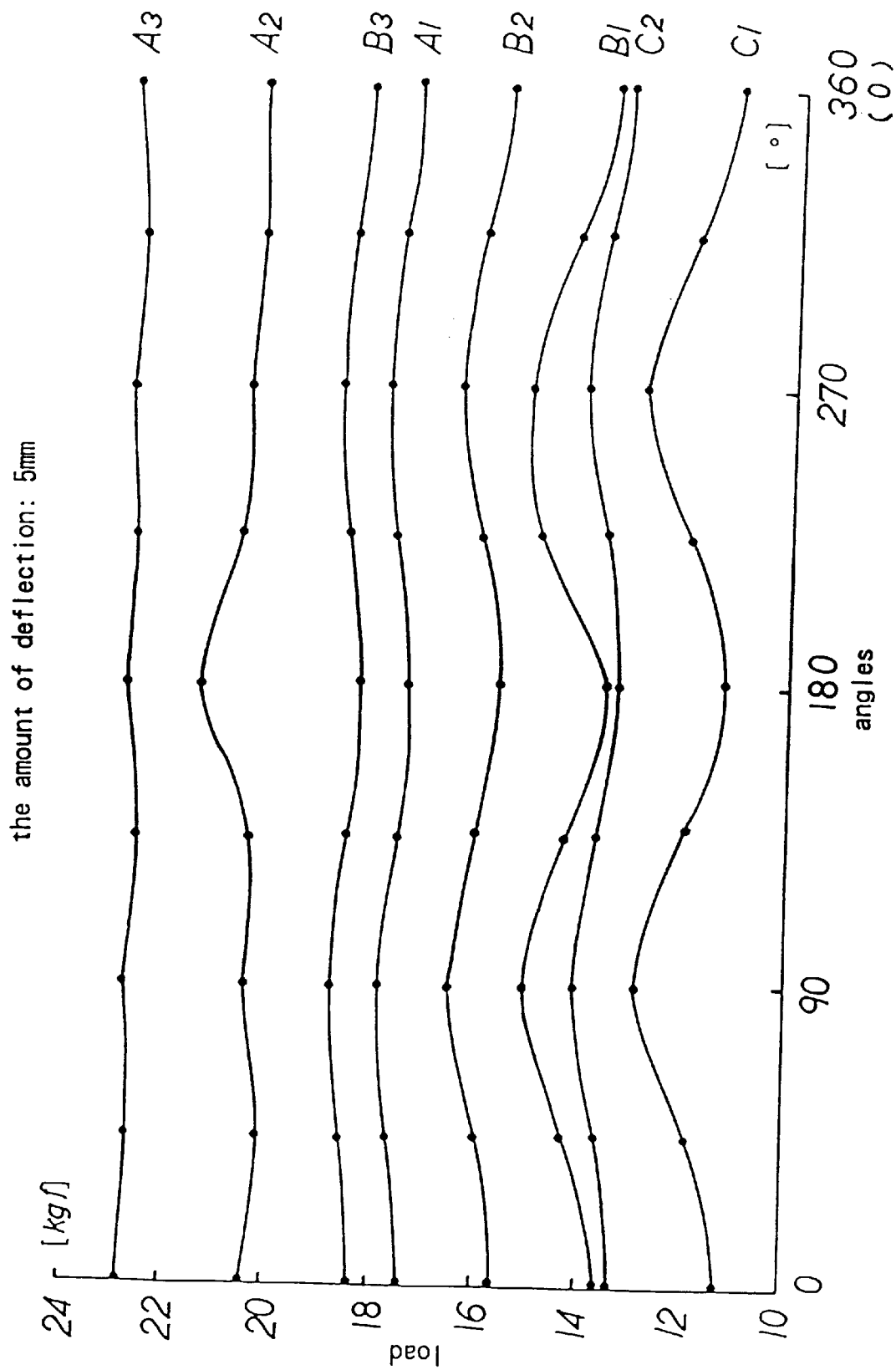
FIG. 8 is a graph showing a relation between a load and an angle of load application to the rotating boring tool.

Next, a relation between the load P for obtaining the same amount of deflection of 5 mm and the direction of load application is shown in FIG. 8. The direction of load application is indicated in angle. Consequently, the load applied to the specimens B and C is the minimum value $P_{min}$ at angles 0° and 180°, and the maximum value $P_{max}$ at angles 90° and 270°. It has become clear that a large difference is present between the maximum value and the minimum value when the flutes are of normal depth, but the difference can be made smaller by decreasing the depth of the flutes as in the case of C2 and B2 and difference can be made smaller by approaching the flutes as in the case of B3.

In B1, the minimum value is 89.5% of the maximum value, and in C1, the minimum value is 85% of the maximum value.

Figure 9:
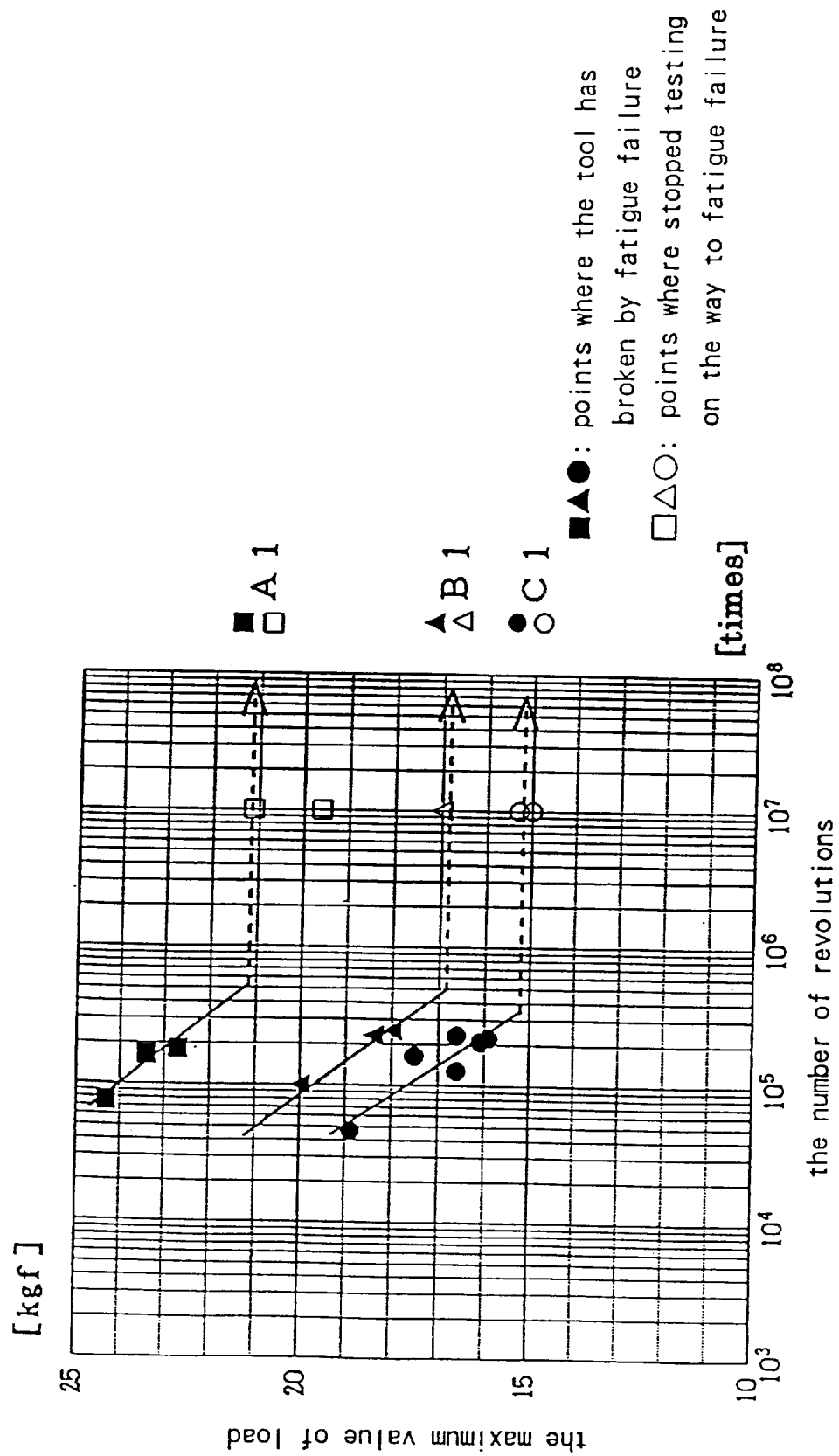
FIG. 9 is a graph showing a relation between the maximum value of load applied to the rotating boring tool and the number of revolutions until fatigue failure of the rotating boring tool.

Next, a relation between the maximum value of load $P_{max}$ and the number of revolutions N until breakage of the specimens B1 and C1 is shown in FIG. 9. According to this drawing, it has become clear that the specimen B1 is more liable to fatigue failure than the specimen C1 when loaded about 1.5 kgf greater. The specimen B1 will not fracture under the load of 16.8 kgf or lower, while the specimen C1 will not fracture under the load of 15.3 kgf or lower.

As has been explained, the portion on the opposite side of flutes is increased in width by bringing the flutes in the f1 portion of the rotating boring tool substantially close to each other, thereby increasing the rigidity of the f1 portion. As a result, it has become possible to suppress the generation of fatigue failure in the f1 portion, and to obtain a long-life, hard-to-break rotating boring tool, and further to largely decrease a product cost and a cost for replacement of the rotating boring tool. Consequently, it has also become possible to apply the rotating boring tool to unattended automatic cutting.

Subsequently, a second embodiment of a rotating boring tool 20 will be described with reference to FIG. 2A–2E.

Figure 2A:
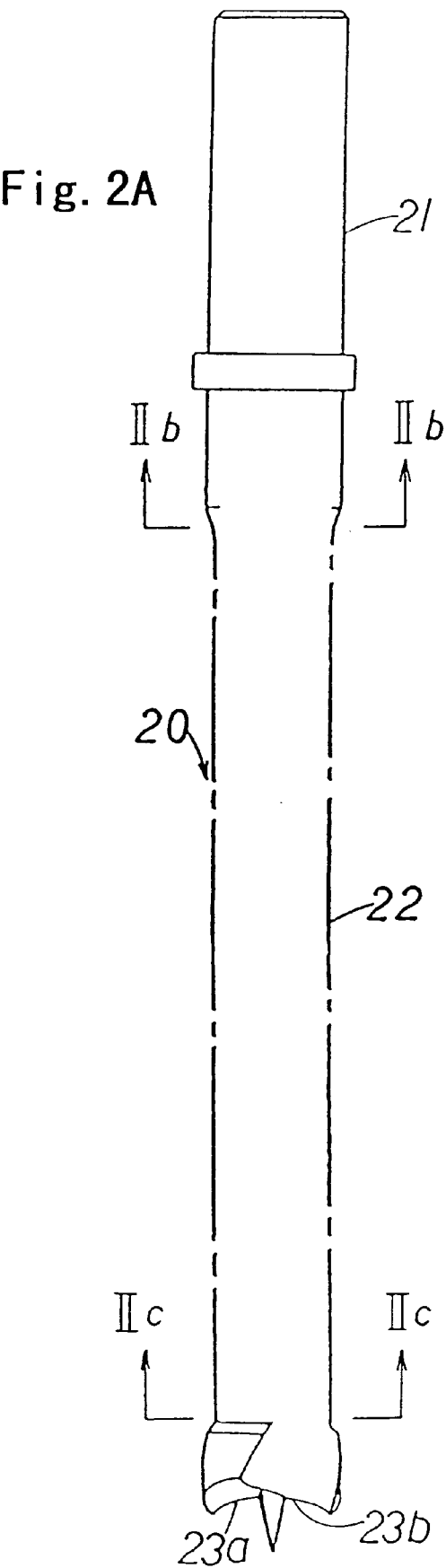
FIG. 2A is a front view schematically showing a second embodiment of a rotating boring tool according to the present invention.
Figure 2B:
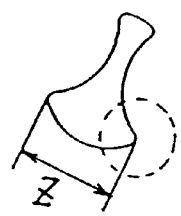
FIG. 2B is a sectional view of the rotating boring tool illustrated in FIG. 2A along the line $II_b$—$II_b$.
Figure 2C:
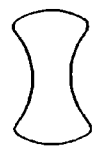
FIG. 2C is a sectional view of the rotating boring tool illustrated in FIG. 2A along the line $II_c$—$II_c$.
Figure 2D:
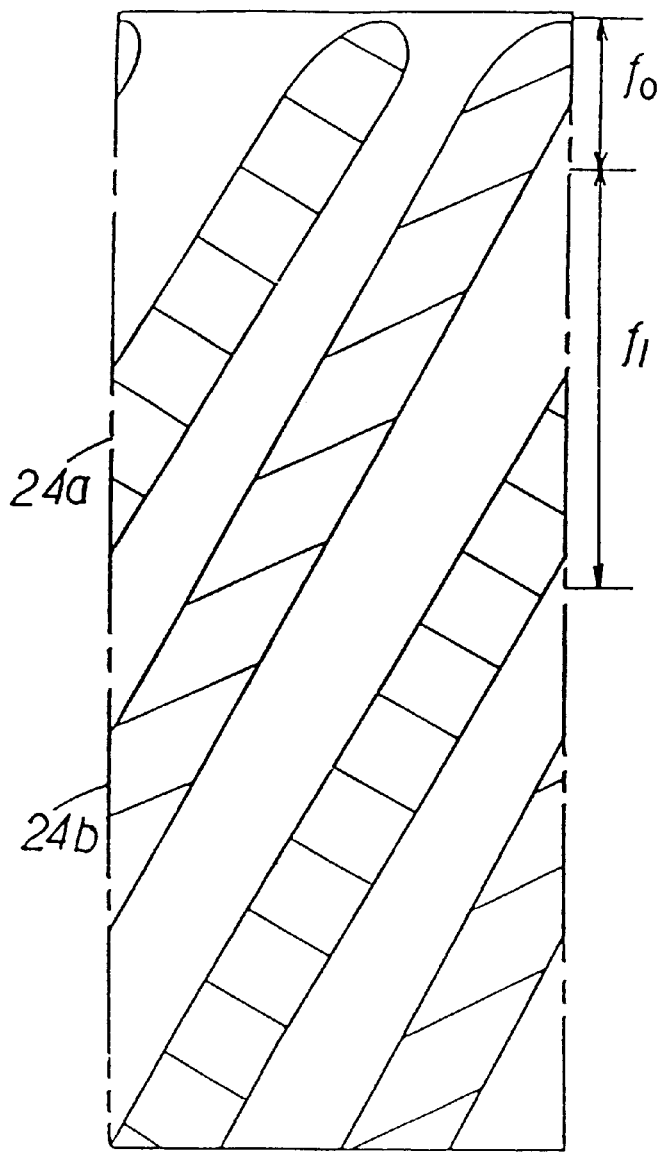
FIG. 2D is a development of the flutes of the rotating boring tool illustrated in FIG. 2A.

The rotating boring tool 20, as shown in FIG. 2A, has a cylindrical body 22 formed coaxially with a cylindrical shank 21. At the tip end of the body 22 a pair of cutting blades 23a, 23b are provided in point symmetrical positions with respect to the axis of the tool. The body 22 is provided with two flutes 24a and 24b, each at a predetermined helix angle, continuous from the cutting blades 23a and 23b as shown in the development of the flutes in FIG. 2D. The two flutes 24a and 24b, as shown in FIG. 2A to 2C, gradually approach each other as they go to the terminal end portion f0 of the flutes from the tip end portion; at the f1 portion the both flutes are formed substantially close to each other, so that, as shown in FIG. 2B, the chordal length z relative to the circular arc of the outer periphery of a widened thick portion of the body will be about 80% or more of the diameter of the sectional portion. Thus the minimum value of flexural rigidity of the f1 portion is set at about 89% of the maximum value.

Figure 2E:
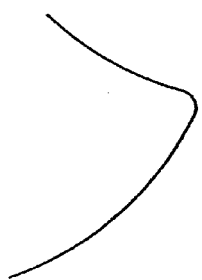
FIG. 2E is a partial view of ridge lines by the flutes and the outer peripheral surface of a second embodiment of a rotating boring tool.

The rotating boring tool 20, as shown in the enlarged view of FIG. 2E, ridge lines formed by the flutes and the outer peripheral surface are chamfered to 0.5 R. The R chamfer may be substituted for by the same degree of other type of chamfer. Therefore stress concentration to a fine rough part of the ridge-line portion is lessened, thereby restraining the fatigue failure of the body when the body is deflected with load application. A test result of the second embodiment is omitted.

Next, a third embodiment of the rotating boring tool 30 will be explained with reference to FIG. 3A–3E.

Figure 3A:
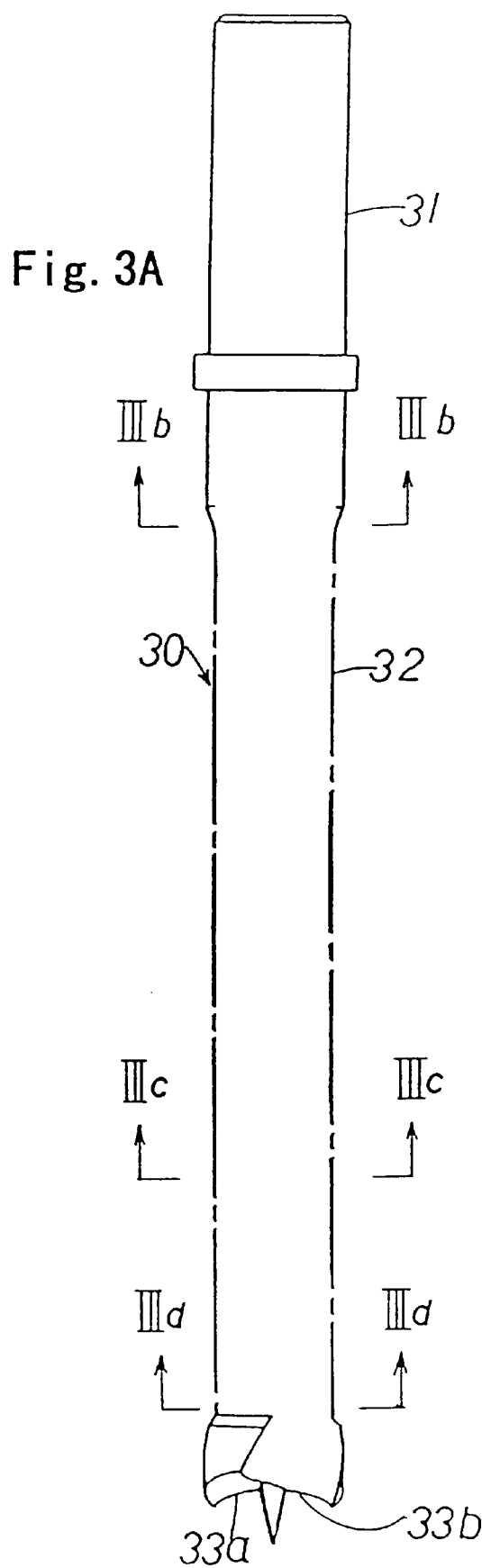
FIG. 3A is a front view schematically showing a third embodiment of a rotating boring tool according to the present invention.
Figure 3B:
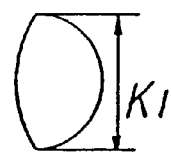
FIG. 3B is a sectional view of the rotating boring tool illustrated in FIG. 3A along the line $III_b$—$III_b$.
Figure 3C:
FIG. 3C is a sectional view of the rotating boring tool illustrated in FIG. 3A along the line $III_c$—$III_c$.
Figure 3D:
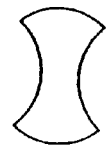
FIG. 3D is a sectional view of the rotating boring tool illustrated in FIG. 3A along the line $III_d$–$III_d$.
Figure 3E:
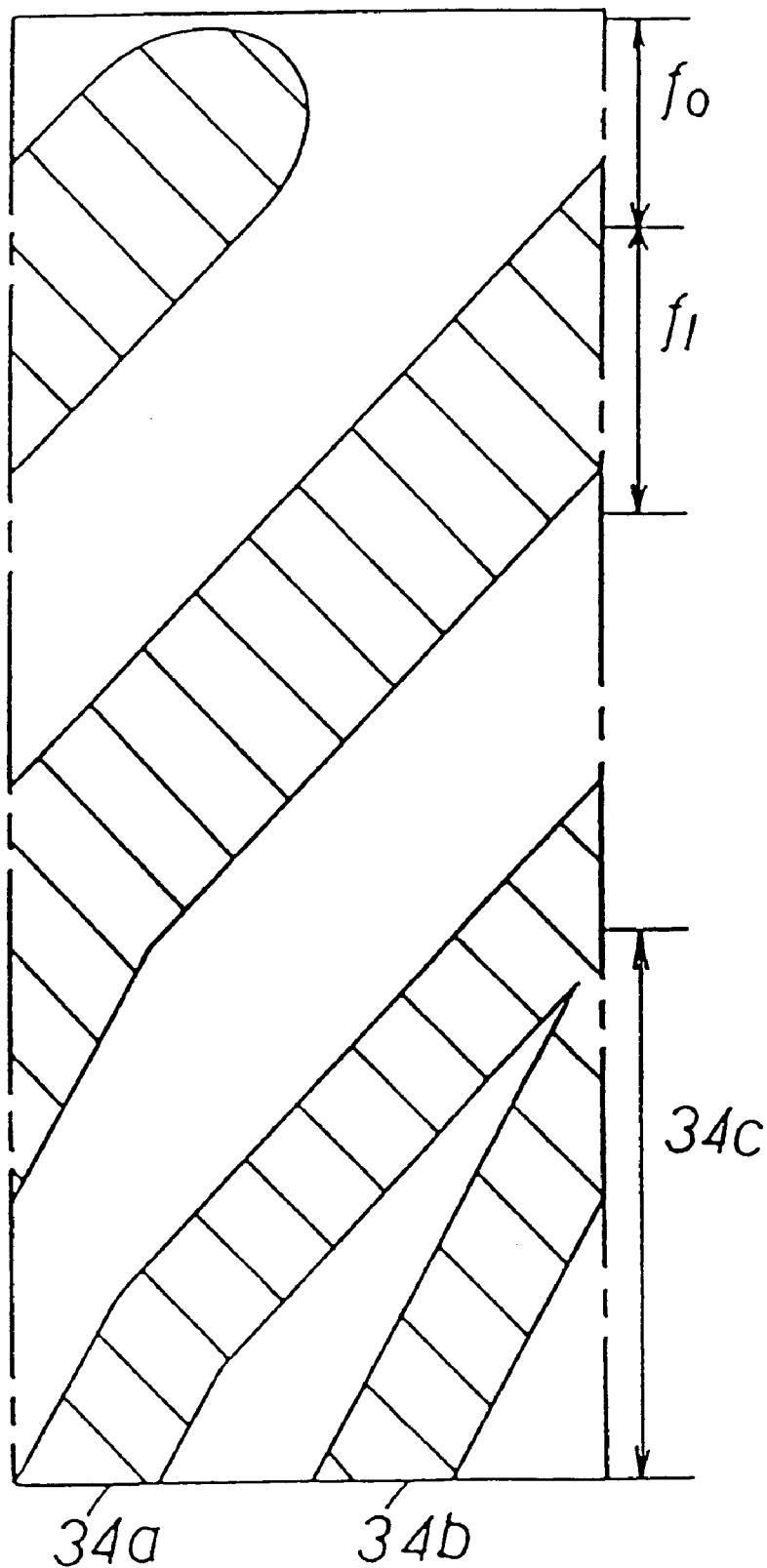
FIG. 3E is a development of the flutes of the rotating boring tool illustrated in FIG. 3A.

The rotating boring tool 30 has a cylindrical shank 31 and a cylindrical body 32, which are formed coaxially. At the tip end of the body 32 a pair of cutting blades 33a and 33b are positioned in point symmetry with respect to the axis of the tool. The body 32, as shown in the development of the flutes in FIG. 3E, is provided with two flutes 34a and 34b formed continuously from the cutting blades 33a and 33b. The flutes 34a and 34b differ in the helix angle between the vicinity 34c of the tip end and the portion above it. The both flutes 34a, 34b, as shown in FIG. 3E, gradually approach each other after the tip end, joining completely in the F1 portion. The state of change in the cross section of the body is shown in FIG. 3B to FIG. 3D. The chordal length k1 relative to the circular arc of the outer periphery of a widened thick portion is about 100% of the diameter of the sectional portion. Thus the minimum value of flexural rigidity of the f1 portion is set at about 96% of the maximum value.

A fatigue failure test stated in the first embodiment was conducted on specimens pertaining to the third embodiment.

The specimens used are A1 (the type shown in FIG. 3A, in which the flutes are the same bottom diameter as B1, and a flute helix angle of the f1 portion is 45°), A2 (A1 whose change of flutes in the bottom diameter is the same as that of B2), and A3 (A2 having 40° in a flute helix angle). The body of these specimens measures 206 mm length and 14.4 mm φ in diameter.

Next, to explain a result of measurements, the maximum value of load $P_{max}$ and the amount of deflection, as shown in FIG. 7, are in a proportional relation similarly to the specimens B1 to B3 and the specimens C1 and C2. The specimens A2 and A3 have greater rigidity than the specimens B1 to B3 and the conventional specimens C1 and C2. The specimen A1 alone has lower rigidity than the specimen C3.

Next, a relation between the load P for obtaining the same amount of deflection of 5 mm and the direction of load application will be shown in FIG. 8. The specimen Al has much the same slight angular dependence as B3. The specimen A3 has little angular dependence.

Next, a relation between the maximum value of load $P_{max}$ and the number of revolutions N until breakage is shown in FIG. 9. As shown in this drawing, it is clear that the specimen A1 is not liable to fatigue failure if no greater load than that for the specimens B1 and C1 is applied. Also the specimen A1 will not fracture at the load of 21.2 kgf or under.

As has been explained, the width of a widened thick portion on the opposite side where the flutes in the f1 portion are joined is increased by joining the flutes in the f1 portion of the rotating boring portion, thereby largely increasing the rigidity of the f1 portion. As a result, it becomes possible to suppress generation of fatigue failure in the f1 portion, thus providing a long-life, very hard-to-break rotating boring tool. Both a product cost and a cost for replacement of the rotating boring tool can be considerably reduced. Consequently it has become possible to adapt the rotating boring tool to unattended automatic cutting operation.

Next, a first modification of each of the above-described embodiments will be explained with reference to FIG. 4A–4D.

Figure 4A:
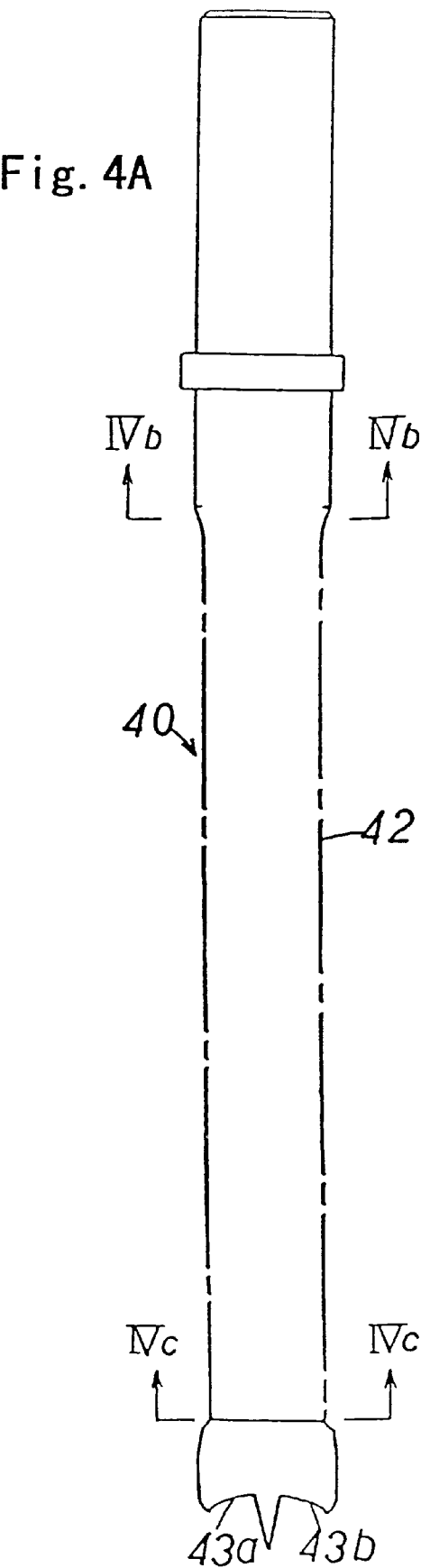
FIG. 4A is a front view schematically showing a modification 1 of the rotating boring tool.
Figure 4B:
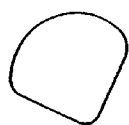
FIG. 4B is a sectional view of the rotating boring tool illustrated in FIG. 4A along the line $IV_b$—$IV_b$.
Figure 4C:
FIG. 4C is a sectional view of the rotating boring tool illustrated in FIG. 4A along the line $IV_c$—$IV_c$.
Figure 4D:
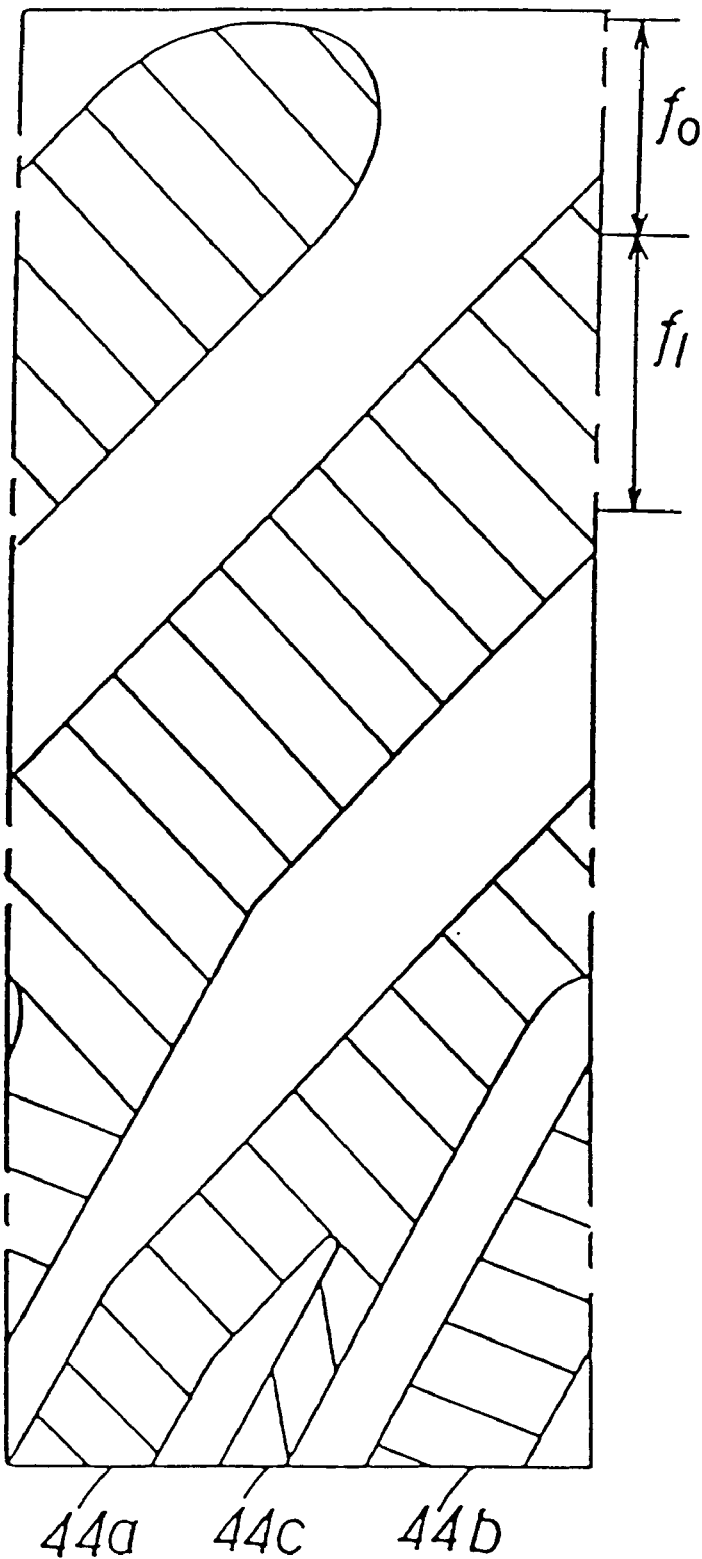
FIG. 4D is a development of the flutes of the rotating boring tool illustrated in FIG. 4A.
Figure 5D:
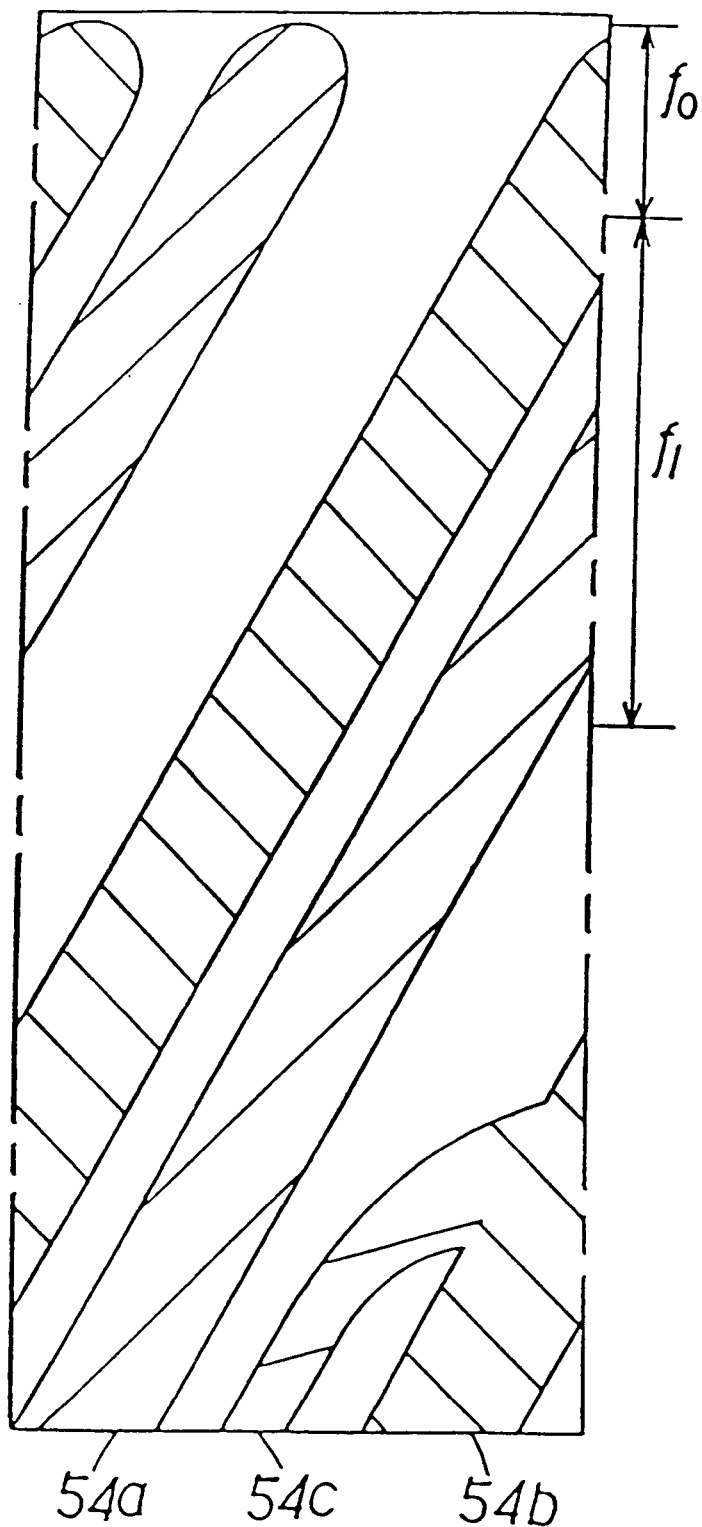
FIG. 5D is a development of the flutes of the rotating boring tool illustrated in FIG. 5A.

A rotating boring tool 40, as shown in FIG. 4A, is provided with a pair of main cutting blades 43a and 43b in imbalanced positions with respect to the axis of the tool, at the tip end portion of the body 42. The body 42, as shown in the development of the flutes in FIG. 4D, has two flutes 44a and 44b formed at the same helix angle, continuously from the main cutting blades 43a and 43b. And formed at the tip end portion are unillustrated small minor cutting blades and shallow minor flutes 44c continuous therefrom, thereby decreasing a component force perpendicular to the axis of the tool to balance the cutting resistance. In FIG. 4A to 4C are shown a rotating boring tool, in which the two flutes 44a and 44b gradually approach after the tip end portion, and are fully joined in the f1 portion.

Another modification 2 using the minor cutting blades and minor flutes 54c is shown in FIG. 5A to 5D. A rotating boring tool 50 has at the tip end portion unillustrated small minor cutting blades and shallow minor flutes 54c continuous therefrom; main flutes 54a and 54b are brought closer to each other from the tip end portion of the body 52, thus providing the f1 portion with a widened thick portion.

Also the rotating boring tool pertaining to each modification of the above-described constitution, similarly to the rotating boring tool of each of the above-described embodiments, can suppress generation of fatigue failure of the f1 portion, thereby enabling the provision of a long-life, very hard-to-break rotating boring tool and accordingly gaining advantages stated in each of the above-described embodiments.

Of the ridge line formed by the flutes and outer peripheral surface of the rotating boring tool of each of the above-described embodiments, at least the ridge line in the f1 portion may be provided with an R chamfer indicated in the second embodiment or with the same degree of chamfer of other type.

Also, as shown in the test result, flute depth may be decreased gradually or in steps as the flutes approach the terminal end portion f0 from the tip end portion under the condition that chip discharge will not be disturbed. And, furthermore, flute width may be similarly adjusted for narrowing. By properly carrying out these adjustments, the f1 portion can be increased in width, and greater in the rigidity of the rotating boring tool.

Furthermore, it is possible to assure smoother discharge of chips by performing surface treatment for lubrication of the flutes and other places to reduce chip friction, if necessary.

Furthermore, in the above-described embodiments, the tool having the cutting blades in two places at the tip end portion has been described; the tool having the cutting blades in three places or more can make one part of thick portions wider by joining the flutes to two or less before they reach the f1 portion from the cutting blades.

The shape of the cutting blades at the tip end shown in each of the above-described embodiments is just one example, and may be changed according to purpose of use and application.

INDUSTRIAL USABILITY

The rotating boring tool of the present invention, as previously stated, is usable in boring wood, metal and other kinds of works, and particularly suitable for use in boring at a high speed such as wood, and plastics, inorganic materials e.g., plasterboard, foamed concrete, equivalent to wood, which produce a large amount of chips.

What is claimed is:

1. A rod-like rotating boring tool having a shank and a body, comprising: main cutting blades formed in two to four places at a tip end portion of said body; main flutes formed in said body continuously from said main cutting blades; and a widened thick portion provided by forming thick portions imbalanced with said flutes brought closer to each other or joined within a range of at least a ½ lead before a terminal end portion of said main flutes, thereby increasing a minimum value of flexural rigidity within a range of formation of said widened thick portion over 89% of a maximum value of flexural rigidity.

2. A rod-like rotating boring tool having a shank and a body, comprising: main cutting blades formed in two places of point symmetry with respect to an axis of said tool at a tip end portion of said body; two flutes formed in said body continuously from said main cutting blades, said flutes having a different helix angle partly or through an entire portion; and a widened thick portion provided by forming thick portions imbalanced with said flutes brought closer to each other or joined within a range of at least a ½ lead before a terminal end portion of said flutes, thereby increasing a minimum value of flexural rigidity within a range of formation of said widened thick portion over 89% of a maximum value of flexural rigidity.

3. A rod-like rotating boring tool having a shank and a body, comprising: main cutting blades formed in two places imbalanced with respect to an axis of said tool at a tip end portion of said body; two main flutes formed in said body continuously from said main cutting blades; and a widened thick portion provided by forming thick portions imbalanced with said flutes brought closer to each other or joined within a range of at least a ½ lead before a terminal end portion of said flutes, thereby increasing a minimum value of flexural rigidity within a range of formation of said widened thick portion over 89% of a maximum value of flexural rigidity.

* * * * *